US012771550B2

(12) United States Patent
Khan et al.

(10) Patent No.: US 12,771,550 B2
(45) **Date of Patent: *Oct. 20, 2026**

(54) METHOD AND SYSTEM OF ASSOCIATING CUSTOM CARD DESIGNS WITH NON-FUNGIBLE TOKENS

(71) Applicant: Mastercard International Incorporated, Purchase, NY (US)

(72) Inventors: Jamal Khan, Ridgefield, NJ (US); Oskar Duris, Walnut Creek, CA (US); Noah Tavares, Burlingame, CA (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 56 days.

This patent is subject to a terminal disclaimer.

(21) Appl. No.: 18/904,443

(22) Filed: Oct. 2, 2024

(65) Prior Publication Data

US 2025/0023738 A1 Jan. 16, 2025

Related U.S. Application Data

(63) Continuation of application No. 17/522,527, filed on Nov. 9, 2021, now Pat. No. 12,137,168.

(51) Int. Cl.
*H04L 29/06* (2006.01)
*H04L 9/30* (2006.01)
(Continued)

(52) U.S. Cl.
CPC .............. *H04L 9/3236* (2013.01); *H04L 9/30* (2013.01); *H04L 9/3247* (2013.01); *H04L 9/50* (2022.05)

(58) Field of Classification Search
CPC ....... H04L 9/3236; H04L 9/30; H04L 9/3247; H04L 9/50; H04L 9/32; H04L 9/3213;
(Continued)

(56) References Cited

U.S. PATENT DOCUMENTS

| | | | |
|---|---|---|---|
| 10,298,396 | B1 | 5/2019 | Kurani et al. |
| 11,308,487 | B1 | 4/2022 | Foster et al. |
| 2020/0058021 | A1 | 2/2020 | Mittal et al. |

OTHER PUBLICATIONS

International Search Report dated Feb. 6, 2023, corresponding to PCT/US2022/048351 (10 Pages).

*Primary Examiner* — Edward Zee
*Assistant Examiner* — Leynna Truvan
(74) *Attorney, Agent, or Firm* — Panitch Schwarze Belisario & Nadel LLP

(57) ABSTRACT

A method for performing dual verification to combine a non-fungible token (NFT) with a digital payment instrument includes: receiving a first set of authentication credentials and a second set of authentication credentials, the first including a transaction account identifier, and the second set including an NFT identifier and a public key of a cryptographic key pair; performing a first verification process using the first set of authentication credentials based on at least a comparison of the first set of authentication credentials with data associated with a transaction account identified using the transaction account identifier; performing a second verification process using at least the second set of authentication credentials based on validation of a digital signature using the public key, the digital signature being identified using the NFT identifier; and transmitting a result of the first verification process and the second verification process to a computing device.

16 Claims, 6 Drawing Sheets

(51) Int. Cl.
*H04L 9/32* (2006.01)
*H04L 9/00* (2022.01)

(58) Field of Classification Search
CPC . H04L 9/3228; H04L 9/3273; H04L 63/0807; H04L 63/0869; H04L 2463/082; H04L 9/0637; G06Q 20/3821; G06Q 20/38215; G06Q 20/3825; G06Q 20/401; G06Q 20/3674; G06Q 20/388; G06Q 20/409; G06Q 20/4097; G06Q 20/00; G06Q 20/08; G06Q 20/22; G06Q 20/3255; G06Q 20/326; G06Q 20/38; G06Q 20/386; G06V 10/225; G11B 20/00181; G11B 19/122; H04N 21/8352; H04N 21/4185; H04N 21/47211; G03H 1/0011; H04M 2203/6072; H04M 15/68; H04M 17/02; H04W 12/06; H01B 17/04
See application file for complete search history.

METHOD AND SYSTEM OF ASSOCIATING CUSTOM CARD DESIGNS WITH NON-FUNGIBLE TOKENS

FIELD

The present disclosure relates to associating custom card designs with non-fungible tokens (NFTs), specifically the use of a dual verification process to combine a NFT with a digital payment instrument, such as a digital credit card in a digital wallet.

BACKGROUND

Consumers have long been interested in customization. Many consumers actively try and customize any products that they own, such as by selecting specific styles or colors. In the financial industry, customization typically comes in the form of special designs for credit cards, debit cards, or checks. In such cases, a consumer is often provided with a selection of different designs for the face of a card or check, or can even be given the option to supply their own image to be used as the face of their credit or debit card.

In addition to customization, some consumers value exclusivity. Exclusivity for a consumer can come in the form of purchasing a product that is only available for a limited time or in limited numbers. Such opportunities can often see consumers paying a premium for access to such an exclusive product. In recent times, consumers' need for exclusivity can be seen in the rise of the popularity and money involved in the use of non-fungible tokens (NFTs). A NFT is a digital object that represents a user's ownership of an associated item, most often digital art. The creator of the item can generate a NFT for the item on a blockchain, and then transfer the NFT to a buyer as part of a transaction. The buyer then owns the NFT by having control over it, and is free to hold on to the NFT or sell it to another user. While another user may be able to generate a copy of the associated item, only the buyer of the NFT will have the sole NFT created for that item. Some users have likened it to physical art, where multiple people may have prints of a famous artwork, but there is only one original copy of the art.

Currently, there is no mechanism in place for utilizing NFTs to enable customization of other products. Given consumer interest in customizing their payment instruments, and with the popularity of NFTs, there is a need for a technological system that can use NFTs to enable consumers to have exclusive, customized digital payment instruments.

SUMMARY

The present disclosure provides a description of systems and methods for performing dual verification to combine a NFT with a digital payment instrument. A user interested in having a customized, exclusive digital payment instrument, such as a digital credit card, can prove ownership of both a transaction account for which the digital payment instrument is requested and a NFT that corresponds to an image that the user is interested in using as the face of their digital payment instrument. Ownership of the transaction account can be performed using a suitable authentication process through, for instance, providing unique account information or login credentials for an account registered with an associated entity. Ownership of the NFT can be performed via validation of a digital signature generated using a blockchain wallet that has ownership of the NFT on a blockchain. In some cases, the user may first select or supply an image and facilitate the creation of the NFT, where such a process may result in proof of ownership. If verification of ownership of both the transaction account and NFT are successful, then a digital payment instrument that uses the image associated with the NFT as a face of the instrument can be provided to the consumer for storage in a digital wallet and future use in payment transactions. The result is that a user can have a digital payment instrument with exclusive artwork that cannot be used by anyone else because of the use of NFTs.

A method for performing dual verification to combine a non-fungible token (NFT) with a digital payment instrument includes: receiving, by a receiver of a processing server, a first set of authentication credentials and a second set of authentication credentials, the first set of authentication credentials including at least a transaction account identifier, and the second set of authentication credentials including at least an NFT identifier and a public key of a cryptographic key pair; performing, by a processor of the processing server, a first verification process using at least the first set of authentication credentials based on at least a comparison of one or more values included the first set of authentication credentials with one or more values associated with a transaction account identified using the transaction account identifier; performing, by the processor of the processing server, a second verification process using at least the second set of authentication credentials based on validation of a digital signature using the public key, the digital signature being identified using at least the NFT identifier; and transmitting, by a transmitter of the processing server, a result of the first verification process and a result of the second verification process to a computing device.

A system for performing dual verification to combine a non-fungible token (NFT) with a digital payment instrument includes: a computing device; and a processing server, the processing server including a receiver receiving a first set of authentication credentials and a second set of authentication credentials, the first set of authentication credentials including at least a transaction account identifier, and the second set of authentication credentials including at least an NFT identifier and a public key of a cryptographic key pair, a processor performing a first verification process using at least the first set of authentication credentials based on at least a comparison of one or more values included the first set of authentication credentials with one or more values associated with a transaction account identified using the transaction account identifier, and a second verification process using at least the second set of authentication credentials based on validation of a digital signature using the public key, the digital signature being identified using at least the NFT identifier, and a transmitter transmitting a result of the first verification process and a result of the second verification process to a computing device.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Further areas of applicability of the present disclosure will become apparent from the detailed description provided hereinafter. It should be understood that the detailed description of exemplary embodiments is intended for illustration purposes only and are, therefore, not intended to necessarily limit the scope of the disclosure.

DETAILED DESCRIPTION

Figure 1:
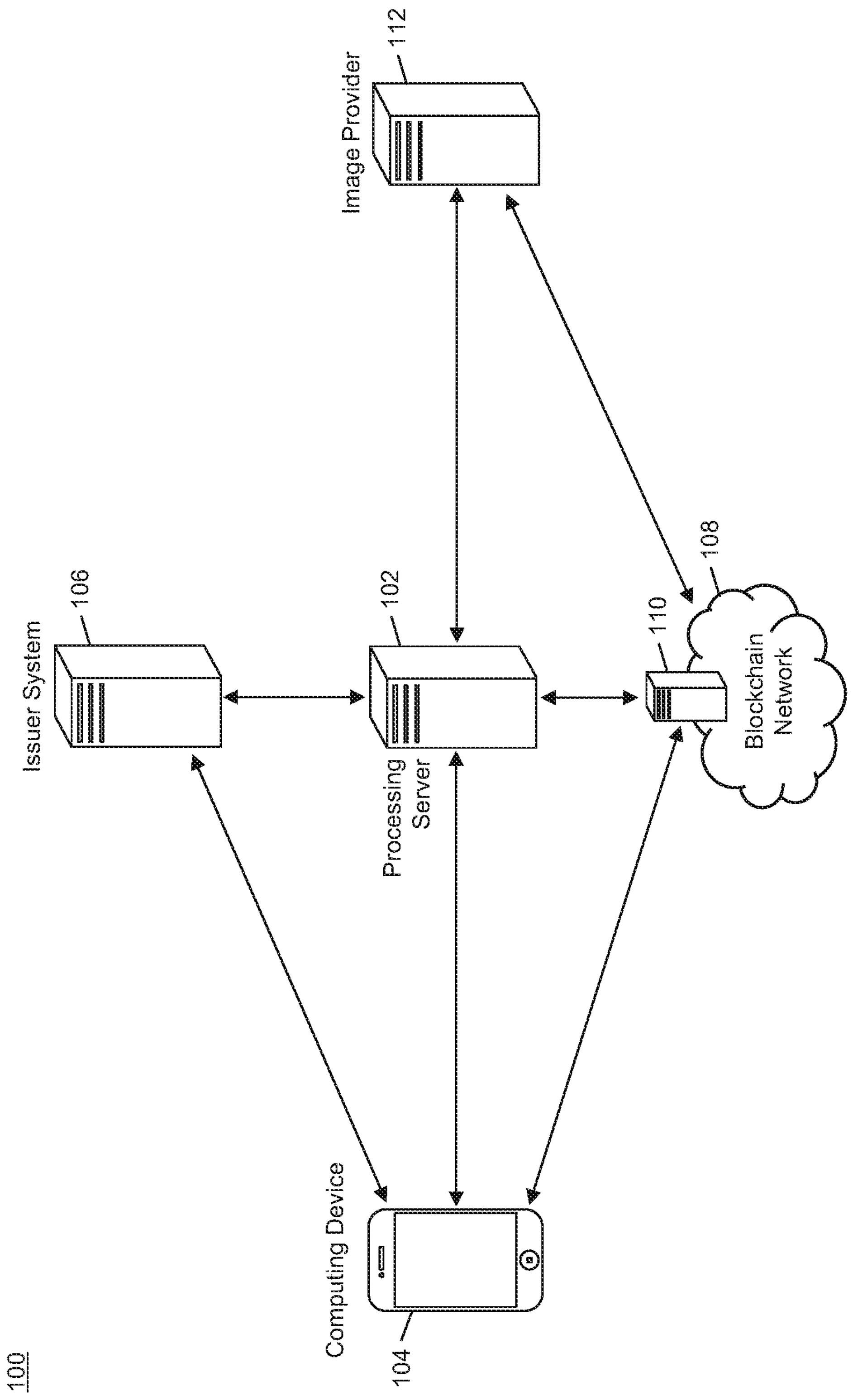
FIG. 1 is a block diagram illustrating a high-level system architecture for dual verification in combination of NFTs with digital payment instruments in accordance with exemplary embodiments.

System for Using Dual Verification to Integrate NFTs with Digital Payment Instruments FIG. 1 illustrates a system 100 that utilizes a dual verification process to result in a combination of the use of non-fungible tokens (NFTs) with digital payment instruments to provide instruments with exclusive designs.

As discussed herein, the term "transaction account" can refer to a financial account that may be used to fund a transaction, such as a checking account, savings account, credit account, virtual payment account, etc. A transaction account may be associated with a consumer, which may be any suitable type of entity associated with a payment account, which may include a person, family, company, corporation, governmental entity, etc. In some instances, a transaction account may be virtual, such as those accounts operated by PayPal®, etc.

The system 100 can include a processing server 102. The processing server 102, discussed in more detail below, can be configured to perform dual verification to facilitate the integration of NFTs with digital payment instruments to provide an exclusive, customized digital payment instrument to a user computing device 104. The computing device 104 can be any type of device suitable for performing the functions discussed herein, such as a desktop computer, laptop computer, tablet computer, notebook computer, cellular phone, smart phone, smart watch, smart television, wearable computing device, etc.

In the system 100, the user of the computing device 104 can be issued a transaction by an issuer system 106. The issuer system 106 can be a computing system operated by or otherwise associated with an entity that issues financial transaction accounts that can be used to fund electronic payment transactions. The issuer system 106 may issue a transaction account to the user of the computing device 104, such as a credit card account or a debit account, where the computing device 104 may be issued a digital payment instrument for use in funding electronic payment transactions. A digital payment instrument may be a data object stored on the computing device 104 that can be used to convey payment details to a merchant as part of an electronic payment transaction. For example, the computing device 104 can have a digital wallet application program executed thereby that displays a digitized version of a traditional credit card to the user of the computing device 104, where use of that digital payment instrument can result in payment details (e.g., sufficient data associated with the transaction account suitable for enabling a payment transaction to be processed that is funded via the transaction account, such as an account number, expiration date, security code, name, billing zip code, etc.) being electronically transmitted to a merchant point of sale system using a suitable method, such as radio frequency, Bluetooth, near field communication, etc.

Figure 2:
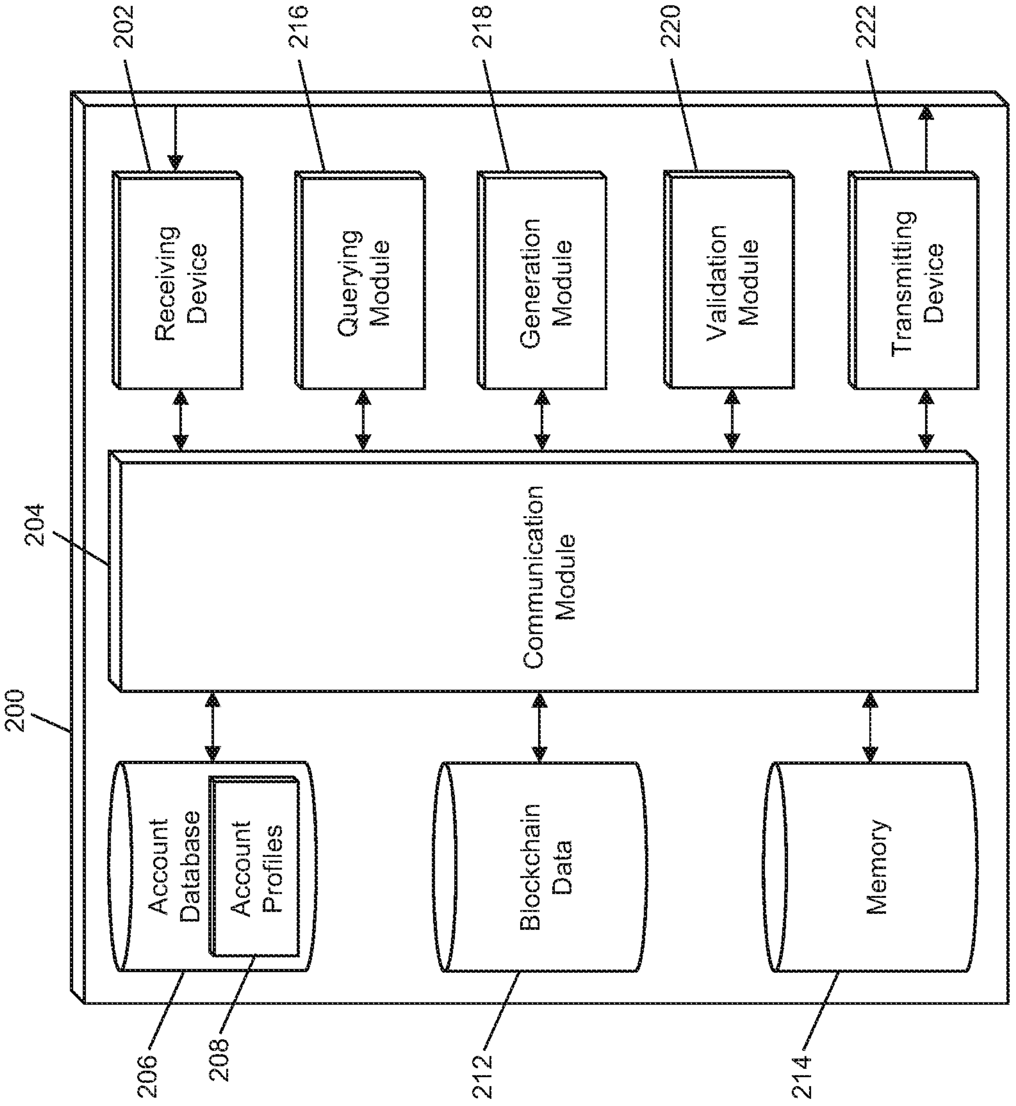
FIG. 2 is a block diagram illustrating a processing server for dual verification in combination of NFTs with digital payment instruments in accordance with exemplary embodiments.
Figure 5:
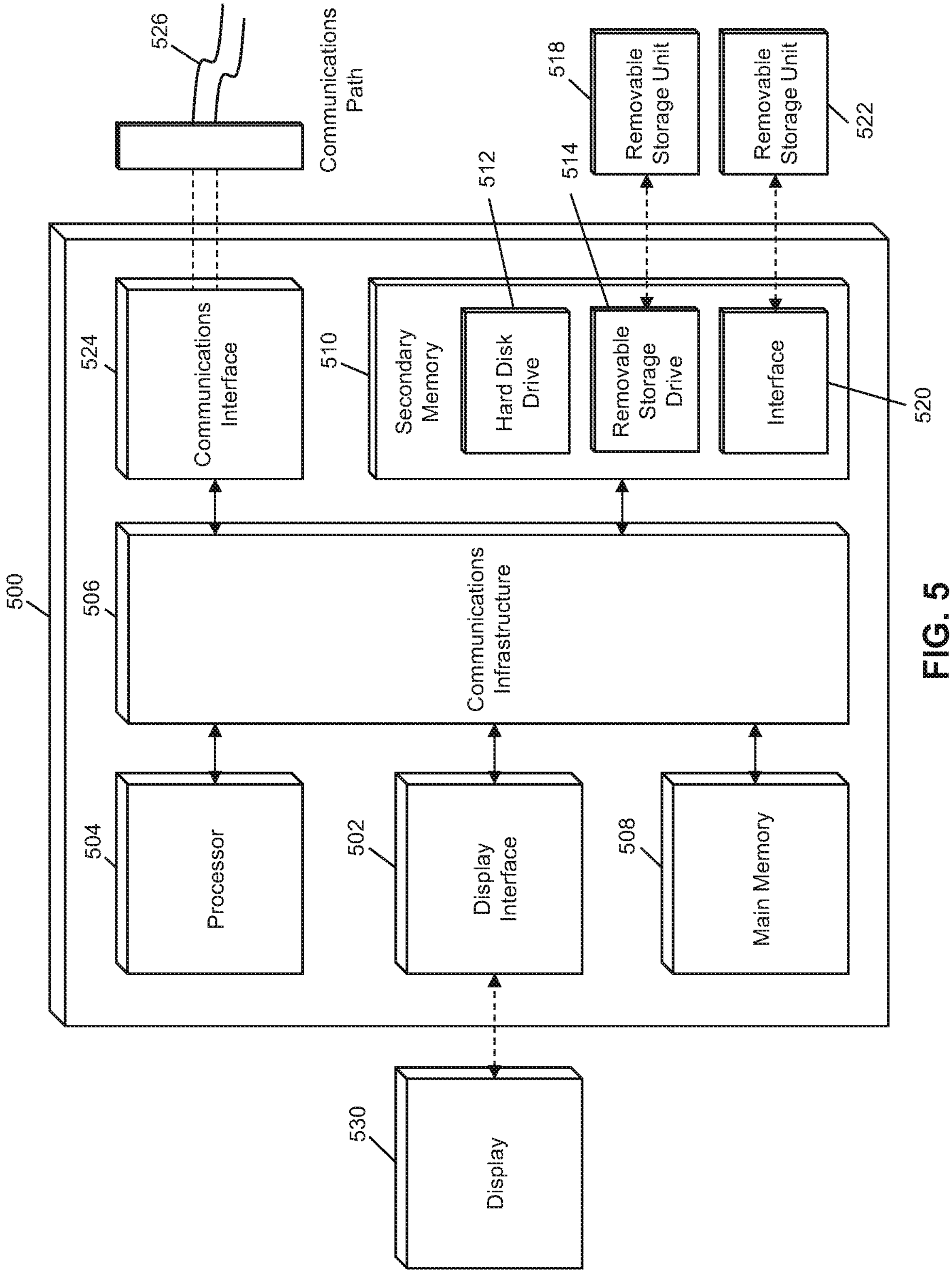
FIG. 5 is a block diagram illustrating a computer system architecture in accordance with exemplary embodiments.

In the system 100, the user of the computing device 104 can be interested in customizing their digitized version of their credit card with an exclusive design. The processing server 102 can be configured to provide the user of the computing device 104 with such an opportunity through the use of an NFT. To facilitate the use of NFTs, the system 100 can include a blockchain network 108. The blockchain network 108 can be comprised of a plurality of blockchain nodes 110. Each blockchain node 110 can be a computing system, such as illustrated in FIG. 2 or 5, discussed in more detail below, that is configured to perform functions related to the processing and management of the blockchain, including the generation of blockchain data values, verification of proposed blockchain transactions, verification of digital signatures, generation of new blocks, validation of new blocks, and maintenance of a copy of the blockchain.

The blockchain can be a distributed ledger that is comprised of at least a plurality of blocks. Each block can include at least a block header and one or more data values. Each block header can include at least a timestamp, a block reference value, and a data reference value. The timestamp can be a time at which the block header was generated and can be represented using any suitable method (e.g., UNIX timestamp, DateTime, etc.). The block reference value can be a value that references an earlier block (e.g., based on timestamp) in the blockchain. In some embodiments, a block reference value in a block header can be a reference to the block header of the most recently added block prior to the respective block. In an exemplary embodiment, the block reference value can be a hash value generated via the hashing of the block header of the most recently added block. The data reference value can similarly be a reference to the one or more data values stored in the block that includes the block header. In an exemplary embodiment, the data reference value can be a hash value generated via the hashing of the one or more data values. For instance, the block reference value can be the root of a Merkle tree generated using the one or more data values.

The use of the block reference value and data reference value in each block header can result in the blockchain being immutable. Any attempted modification to a data value would require the generation of a new data reference value for that block, which would thereby require the subsequent block's block reference value to be newly generated, further requiring the generation of a new block reference value in every subsequent block. This would have to be performed and updated in every single blockchain node 110 in the blockchain network 108 prior to the generation and addition of a new block to the blockchain in order for the change to be made permanent. Computational and communication limitations can make such a modification exceedingly difficult, if not impossible, thus rendering the blockchain immutable.

In some embodiments, the blockchain can be used to store information regarding blockchain transactions conducted between two different blockchain wallets. A blockchain wallet can include a private key of a cryptographic key pair that is used to generate digital signatures that serve as authorization by a payer for a blockchain transaction, where the digital signature can be verified by the blockchain network 108 using the public key of the cryptographic key pair. In some cases, the term "blockchain wallet" can refer specifically to the private key. In other cases, the term "blockchain wallet" can refer to a computing device (e.g., computing device 104, etc.) that stores the private key for use thereof in blockchain transactions. For instance, each computing device can each have their own private key for respective cryptographic key pairs and can each be a blockchain wallet for use in transactions with the blockchain associated with the blockchain network. Computing devices can be any type of device suitable to store and utilize a blockchain wallet, such as a desktop computer, laptop computer, notebook computer, tablet computer, cellular phone, smart phone, smart watch, smart television, wearable computing device, implantable computing device, etc.

Each blockchain data value stored in the blockchain can correspond to a blockchain transaction or other storage of data, as applicable. A blockchain transaction can consist of at least: a digital signature of the sender of currency (e.g., the processing server 102) that is generated using the sender's private key, a blockchain address of the recipient of currency (e.g., the computing device 104) generated using the recipient's public key, and a blockchain currency amount that is transferred, or other data being stored. In some blockchain transactions, the transaction can also include one or more blockchain addresses of the sender where blockchain currency is currently stored (e.g., where the digital signature proves their access to such currency), as well as an address generated using the sender's public key for any change that is to be retained by the sender. Addresses to which cryptographic currency has been sent that can be used in future transactions are referred to as "output" addresses, as each address was previously used to capture output of a prior blockchain transaction, also referred to as "unspent transactions," due to there being currency sent to the address in a prior transaction where that currency is still unspent. In some cases, a blockchain transaction can also include the sender's public key, for use by an entity in validating the transaction. For the traditional processing of a blockchain transaction, such data can be provided to a blockchain node 110 in the blockchain network 108, either by the sender or the recipient. The node can verify the digital signature using the public key in the cryptographic key pair of the sender's wallet and also verify the sender's access to the funds (e.g., that the unspent transactions have not yet been spent and were sent to address associated with the sender's wallet), a process known as "confirmation" of a transaction, and then include the blockchain transaction in a new block. The new block can be validated by other nodes in the blockchain network 108 before being added to the blockchain and distributed to all of the blockchain nodes 110 in the blockchain network 108, respectively, in traditional blockchain implementations. In cases where a blockchain data value cannot be related to a blockchain transaction, but instead the storage of other types of data, blockchain data values can still include or otherwise involve the validation of a digital signature.

In the system 100, ownership of a NFT can be transferred via a transaction on the blockchain, where the NFT itself can be included in a blockchain data value. A NFT can be any digital value that is unique to that NFT among all other NFTs. In some cases, data included in a NFT can vary, such as depending on use of the NFT, its associated digital asset, etc. For instance, a NFT can include a name, identification value, hyperlink, or other data regarding a digital artwork associated with the NFT, such as a link to a copy of the digital artwork, a digital signature generated by the creator of the artwork, an identification number or serial number of the artwork, a hash value generated via hashing of a data file of the digital artwork, etc. Other data that can be included in a NFT include, for example, creation time and/or date of the token, a digital signature generated by the creator of the token, etc. In some cases, a NFT can also include data regarding one or more restrictions on use of the NFT, as discussed in more detail below.

In the system 100, the user of the computing device 104 can submit a request for an exclusive digital payment instrument to the processing server 102 using a suitable communication network and method. For example, computing device 104 can access a webpage associated with the processing server 102 or execute an application program that can establish a communication channel with the processing server 102, such as through an application programming interface. The request for exclusive digital payment instrument can include at least two sets of authentication credentials: a first set of authentication credentials associated with the transaction account to which the digital payment instrument is to correspond, and a second set of authentication credentials associated with a NFT that is associated with a digital artwork the user wants to use for the digital payment instrument.

The first set of authentication credentials can include at least a unique identifier for the associated transaction account and any other data necessary to authenticate the computing device 104 as being authorized to receive a digital payment instrument for the associated transaction account. Such additional data can include, for example, a username, a password, an e-mail address, a telephone number, transaction amounts for one or more transactions funded via the transaction account, etc. In some cases, the data may be dependent on the issuer system 106 that issued the transaction account. For example, a first issuing institution may use a username and password combination for authentication, while a second issuing institution may use a transaction account number or portion thereof and a personal identification number.

The processing server 102 can receive the first set of authentication credentials and perform a first verification process using the first set of authentication credentials. In some embodiments, the processing server 102 can electronically transmit some or all of the first set of authentication credentials to the issuer system 106 (e.g., identified using the transaction account identifier or other data included in the first set of authentication credentials) using a suitable communication network and method. The issuer system 106 can verify if the computing device 104 is authorized to receive a digital payment instrument for the transaction account using the received data (e.g., by checking the supplied username and password combination against the identified transaction account), and electronically transmit a result of the verification back to the processing server 102. In some cases, if the verification is successful, the issuer system 106 may also electronically transmit data to be used in the digital payment instrument to the processing server 102. In other embodiments, the processing server 102 itself can perform the verification via authenticating the data included in the first set of authentication credentials. In such embodiments, the processing server 102 can be a part of the issuer system 106 and therefore have access to transaction account data or can be provided transaction account data by issuer systems 106 for use in performing authentications.

The second set of authentication credentials can include data for use in authenticating the user of the computing device's ownership of a NFT, including at least a NFT identifier and a public key of a cryptographic key pair of a blockchain wallet of the computing device 104. The NFT identifier can be a unique value that is unique to the NFT among all other NFTs stored in the blockchain associated with the blockchain network 108, such as a serial number. In some cases, the NFT identifier can be the full value of the NFT itself. In some cases, the second set of authentication credentials can include additional data for use in authenticating ownership of the NFT, such as a transaction identifier that is associated with the transaction that transferred ownership of the NFT to the computing device's blockchain wallet.

The processing server 102 can receive the second set of authentication credentials and perform a second verification process using the second set of authentication credentials. In some embodiments, the processing server 102 can electronically transmit some or all of the second set of authentication credentials to a blockchain node 110 in the blockchain network 108. The blockchain node 110 can identify the blockchain data entry where the NFT was transferred to the computing device's blockchain wallet (e.g., using the NFT identifier or a transaction identifier) and use the public key to validate a digital signature in the identified blockchain data entry. The blockchain node 110 can electronically transmit the result of the validation to the processing server 102 using a suitable communication network and method. In other embodiments, the processing server 102 itself may identify the blockchain data entry in the blockchain and perform the validation of the digital signature using the public key. In some such embodiments, the processing server 102 can receive a copy of the blockchain, which can be publicly available or otherwise provided to the processing server 102 (e.g., by a blockchain node 110). In some cases, the processing server 102 can be a blockchain node 110 in the blockchain network 108 and maintain a copy of the blockchain as part of the functionality of being a blockchain node 110.

If either verification fails, the processing server 102 can inform the user of the computing device 104 accordingly via a notification electronically transmitted thereto by the processing server 102. In some cases, the computing device 104 may be provided with an opportunity to supply new credentials for another attempt at the failed verification. If both verifications are successful, then the processing server 102 may generate a digital payment instrument that uses the digital artwork associated with the NFT as the face of the payment instrument. The digital payment instrument may be electronically transmitted to the computing device 104 using a suitable communication network and method. The digital payment instrument may be stored in memory accessible by a digital wallet application program on the computing device 104 for use in electronic payment transactions. In some embodiments, the processing server 102 can electronically transmit the digital artwork associated with the NFT to the issuer system 106, where the issuer system 106 can generate the digital payment instrument with the digital artwork and electronically transmit the digital payment instrument to the computing device 104. In some cases, a third party, such as a provider of the digital wallet application program, may be utilized to generate the digital payment instrument.

In some embodiments, the processing server 102 or issuer system 106, as applicable, can generate a hash value of the created digital payment instrument such as by applying a suitable hashing algorithm to the digital payment instrument. The resulting hash value can be electronically transmitted to a blockchain node 110 and added to the blockchain associated with the blockchain network 108. In such an embodiment, storage of the hash value on the blockchain can be used by the computing device 104 to prove ownership of the digital payment instrument, if necessary, without using the digital payment instrument itself.

In cases where the computing device 104 does not already have a NFT for use in customizing the digital payment instrument prior to the process discussed above, the processing server 102 may assist the computing device 104 in obtaining a NFT for desired artwork. In such cases, the computing device 104 may prompt the user thereof to select a digital artwork to be used to customize their digital payment instrument. In some embodiments, the user of the computing device 104 may be able to select any image, such as one stored locally on the computing device 104, for use as the face of their digital payment instrument. In such an embodiment, the computing device 104 can electronically transmit the selected image file to the processing server 102. In some embodiments, the processing server 102 can require the user of the computing device 104 to verify ownership or authorization to use the selected digital artwork, such as through copyright or other suitable method. The processing server 102 can then generate a NFT to be associated with the image and electronically transmit the NFT to a blockchain node 110 in the blockchain network 108, which can include the NFT in a new blockchain data entry. In some instances, the blockchain data entry will include a transfer of ownership to the computing device 104. In such instances, the computing device 104 can also provide a blockchain address (e.g., generated using the public key of the blockchain wallet) to the processing server 102 for a blockchain address associated with the blockchain wallet to where the NFT will be transferred. In other instances, the blockchain data entry may indicate a blockchain wallet of the processing server 102 as owner. In such an instance, a second blockchain data entry may be added to the blockchain that transfers ownership to a blockchain address associated with the blockchain wallet of the computing device 104. In some embodiments, the computing device 104 itself can generate a NFT for the selected digital artwork and can electronically transmit the NFT to the blockchain node 110 for addition to the blockchain.

In some embodiments, the user of the computing device 104 can be required to select a digital artwork from a plurality of available digital artworks. In such embodiments, the system 100 can include one or more image providers 112. The image providers 112 can electronically transmit digital artworks or hyperlinks directed to where digital artworks can be found, which can be made available for selection by users for use in customizing digital payment instruments. In some cases, a NFT for each digital artwork can be generated when the digital artwork is selected by a user for use. In other cases, the processing server 102 or applicable image provider 112 can generate a NFT for each digital artwork prior to it being offered as a selection by a user for use with a digital payment instrument. In such cases, the NFT can be added to the blockchain using the methods discussed above.

The user of the computing device 104 can be presented with a list of all available digital artworks. The user can select a digital artwork and the computing device 104 can electronically transmit an identifier of the digital artwork along with a blockchain address for the computing device's blockchain wallet to the processing server 102. The processing server 102 can then identify (e.g., or generate, as applicable) a NFT associated with the selected digital artwork and instruct a blockchain node 110 to transfer ownership of the NFT to the computing device's blockchain wallet, using the provided blockchain address. The computing device 104 may then have ownership of the NFT and can use the method discussed above to have a digital payment instrument generated that uses the selected digital artwork as a face of the payment instrument.

In some embodiments, a digital artwork can be restricted to a single use, making it exclusive among all users. In such embodiments, each digital artwork can have a single NFT associated therewith. In such cases, the computing device 104 can be provided with only those digital artworks that have not already been used with a digital payment instrument (e.g., ownership of the NFT is still with the processing server 102 or creator of the digital artwork). When a digital artwork is selected, the processing server 102 and/or blockchain node 110 can first verify that the associated NFT is not already owned by a user of a computing device 104 before initiating transfer of ownership of the NFT and subsequent generation of a digital payment instrument using the digital artwork.

In some embodiments, a digital artwork and/or its associated NFT can be subject to one or more restrictions on use. In such embodiments, an image provider 112 can supply the one or more restrictions on use of a digital artwork to the processing server 102 when providing the digital artwork for use. The processing server 102 can maintain a database that includes a NFT identifier and the associated restrictions. In some embodiments, the NFT itself associated with a digital artwork may include the restriction on use of that digital artwork. Restrictions can include any criteria that may be desired by the image provider 112 where compliance therewith can be verified. For example, an image provider 112 can restrict a length of time the digital artwork can be used (e.g., one week, six months, one year, etc.), can require a one or more payments be made for use of the digital artwork (e.g., a one-time use fee, a fee each time the digital payment instrument is used, etc.), can restrict further transfer of the NFT to another entity, can set limits on such additional transfers, etc.

In such embodiments, when the computing device 104 electronically transmits a selection of a digital artwork and/or associated NFT to the processing server 102, the processing server 102 can identify any applicable restrictions to enforce compliance therewith. For instance, if payment is required for use of the digital artwork, the processing server 102 can request payment from the computing device 104 before proceeding. In some cases, the processing server 102 can enforce one or more restrictions through the use of a smart contract. A smart contract can be a self-executable that is stored on the blockchain that executes once one or more criteria are met, where the execution of the smart contract can result in one or more actions to be performed. The processing server 102 can generate a smart contract to be used to enforce restrictions on a NFT and electronically transmit the smart contract to a blockchain node 110 for inclusion in the blockchain.

In an example, an image provider 112 can provide a digital artwork for use as the face of a digital payment instrument but add a restriction that the digital artwork can only be used for three months. The processing server 102 can transfer ownership of the NFT to the computing device 104 upon selection but can also generate a smart contract that is added to the blockchain that automatically reverts ownership back to the processing server 102 or image provider 112 after three months have passed. In such an example, the smart contract may self-execute after three months from a specific time and/or date (e.g., of the block in which the transfer of ownership of the NFT to the computing device 104 was included) and may provide a new blockchain transaction to a blockchain node 110 for addition to the blockchain that transfers the NFT to a blockchain wallet of the processing server 102 and/or image provider 112. In such a case, the computing device 104 may provide a digital signature to the processing server 102 prior to generation of the smart contract for inclusion thereof to be used in ensuring that the transaction reverting ownership of the NFT is successfully validated and added to the blockchain.

The methods and systems discussed herein enable a digital artwork associated with a NFT to be used as the face of a digital payment instrument. A dual verification process ensures ownership or other authorized access to both a transaction account and an NFT, which results in a digital payment instrument that is associated with the transaction account being generated that uses digital artwork associated with the NFT as a face or image of the digital payment instrument. As a result, a user can be provided with an exclusive digital payment instrument where exclusivity thereof can be assured through use of NFTs, which are tracked using an immutable blockchain. The methods and systems discussed herein thus provide users with a new and unique experience through the integration of multiple technologies.

Processing Server

FIG. 2 illustrates an embodiment 200 of a processing server 102. It will be apparent to persons having skill in the relevant art that the embodiment of the processing server 102 illustrated in FIG. 2 is provided as illustration only and cannot be exhaustive to all possible configurations of the processing server 102 suitable for performing the functions as discussed herein. For example, the computer system 500 illustrated in FIG. 5 and discussed in more detail below can be a suitable configuration of the processing server 102. The processing server 102 can be configured to serve as one or more components of the system 100, including the computing device 104, issuer system 106, blockchain nodes 110, and image provider 112.

The processing server 102 can include a receiving device 202. The receiving device 202 can be configured to receive data over one or more networks via one or more network protocols. In some instances, the receiving device 202 can be configured to receive data from computing devices 104, issuer systems 106, blockchain nodes 110, image providers 112, and other systems and entities via one or more communication methods, such as radio frequency, local area networks, wireless area networks, cellular communication networks, Bluetooth, the Internet, etc. In some embodiments, the receiving device 202 can be comprised of multiple devices, such as different receiving devices for receiving data over different networks, such as a first receiving device for receiving data over a local area network and a second receiving device for receiving data via the Internet. The receiving device 202 can receive electronically transmitted data signals, where data can be superimposed or otherwise encoded on the data signal and decoded, parsed, read, or otherwise obtained via receipt of the data signal by the receiving device 202. In some instances, the receiving device 202 can include a parsing module for parsing the received data signal to obtain the data superimposed thereon. For example, the receiving device 202 can include a parser program configured to receive and transform the received data signal into usable input for the functions performed by the processing device to carry out the methods and systems described herein.

The receiving device 202 can be configured to receive data signals electronically transmitted by computing devices 104 that are superimposed or otherwise encoded with sets of authentication credentials, NFT identifiers, digital artwork identifiers, digital artwork data files, NFTs, requests for digital payment instruments, etc. The receiving device 202 can also be configured to receive data signals electronically transmitted by issuer systems 106, which can be superimposed or otherwise encoded with transaction account data, authentication results, verification results, digital payment instruments, etc. The receiving device 202 can be further configured to receive data signals electronically transmitted by blockchain nodes 110 that are superimposed or otherwise encoded with blocks, blockchain data values, blockchain data, confirmation messages, transaction identifiers, authentication results, verification results, hash values, etc. The receiving device 202 can also be configured to receive data signals electronically transmitted by image providers 112, which can be superimposed or otherwise encoded with digital artwork data files, hyperlinks, NFTs, restrictions on digital artwork or NFT usage, etc.

The processing server 102 can also include a communication module 204. The communication module 204 can be configured to transmit data between modules, engines, databases, memories, and other components of the processing server 102 for use in performing the functions discussed herein. The communication module 204 can be comprised of one or more communication types and utilize various communication methods for communications within a computing device. For example, the communication module 204 can be comprised of a bus, contact pin connectors, wires, etc. In some embodiments, the communication module 204 can also be configured to communicate between internal components of the processing server 102 and external components of the processing server 102, such as externally connected databases, display devices, input devices, etc. The processing server 102 can also include a processing device. The processing device can be configured to perform the functions of the processing server 102 discussed herein as will be apparent to persons having skill in the relevant art. In some embodiments, the processing device can include and/or be comprised of a plurality of engines and/or modules specially configured to perform one or more functions of the processing device, such as a querying module 216, generation module 218, validation module 220, etc. As used herein, the term "module" can be software or hardware particularly programmed to receive an input, perform one or more processes using the input, and provides an output. The input, output, and processes performed by various modules will be apparent to one skilled in the art based upon the present disclosure.

The processing server 102 can include an account database 206. The account database 206 can be configured to store a plurality of account profiles 208 using a suitable data storage format and schema. The account database 206 can be a relational database that utilizes structured query language for the storage, identification, modifying, updating, accessing, etc. of structured data sets stored therein. Each account profile 208 can be a structured data set configured to store data related to a transaction account. An account profile 208 can include, for example, a transaction account identifier and authentication data, which can include a username, password, e-mail address, telephone number, personal identification number, transaction account number, etc., and other transaction account details, such as a name, billing zip code, security code, expiration date, etc. An account profile 208 can also store data corresponding to a blockchain wallet that is associated with the related transaction account, such as a public key, any NFTs owned by the blockchain wallet, etc.

The processing server 102 may also include blockchain data 212, which may be stored in the memory 214 of the processing server 102 or stored in a separate area within the processing server 102 or accessible thereby. The blockchain data 212 may include a blockchain, which may be comprised of a plurality of blocks and be associated with the blockchain network 104. In some cases, the blockchain data 212 may further include any other data associated with the blockchain and management and performance thereof, such as block generation algorithms, digital signature generation and confirmation algorithms, communication data for blockchain nodes 110, smart contracts, etc.

The processing server 102 can also include a memory 214. The memory 214 can be configured to store data for use by the processing server 102 in performing the functions discussed herein, such as public and private keys, symmetric keys, etc. The memory 214 can be configured to store data using suitable data formatting methods and schema and can be any suitable type of memory, such as read-only memory, random access memory, etc. The memory 214 can include, for example, encryption keys and algorithms, communication protocols and standards, data formatting standards and protocols, program code for modules and application programs of the processing device, and other data that can be suitable for use by the processing server 102 in the performance of the functions disclosed herein as will be apparent to persons having skill in the relevant art. In some embodiments, the memory 214 can be comprised of or can otherwise include a relational database that utilizes structured query language for the storage, identification, modifying, updating, accessing, etc. of structured data sets stored therein. The memory 214 can be configured to store, for example, cryptographic keys, cryptographic key pairs, communication information, data formatting rules, blockchain data, signature generation algorithms, NFTs, digital artwork files, hyperlinks to digital artwork files, restrictions on usage of digital artworks and/or NFTs, smart contract generation rules, etc.

The processing server 102 can include a querying module 216. The querying module 216 can be configured to execute queries on databases to identify information. The querying module 216 can receive one or more data values or query strings and can execute a query string based thereon on an indicated database, such as the memory 214 of the processing server 102 to identify information stored therein. The querying module 216 can then output the identified information to an appropriate engine or module of the processing server 102 as necessary. The querying module 216 can, for example, execute a query on the account database 206 to identify an account profile 208 related to a request received from a computing device 104 using a transaction account identifier included in a first set of authentication credentials received from the computing device 104.

The processing server 102 can also include a generation module 218. The generation module 218 can be configured to generate data for use by the processing server 102 in performing the functions discussed herein. The generation module 218 can receive instructions as input, can generate data based on the instructions, and can output the generated data to one or more modules of the processing server 102. For example, the generation module 218 can be configured to generate notification messages, confirmation messages, digital signatures, blockchain data values, blocks, unique identifiers, NFTs, smart contracts, digital payment instruments, etc.

The processing server 102 can also include a validation module 220. The validation module 220 can be configured to perform validations for the processing server 102 as part of the functions discussed herein. The validation module 220 can receive instructions as input, which can also include data to be used in performing a validation, can perform a validation as requested, and can output a result of the validation to another module or engine of the processing server 102. The validation module 220 can, for example, be configured to validate digital signatures using suitable signature generation algorithms and keys, perform verification processes on authentication credentials to validate authorization for a transaction account or ownership of a NFT, validate compliance with restrictions on use, etc.

The processing server 102 can also include a transmitting device 222. The transmitting device 222 can be configured to transmit data over one or more networks via one or more network protocols. In some instances, the transmitting device 222 can be configured to transmit data to computing devices 104, issuer systems 106, blockchain nodes 110, image providers 112, and other entities via one or more communication methods, local area networks, wireless area networks, cellular communication, Bluetooth, radio frequency, the Internet, etc. In some embodiments, the transmitting device 222 can be comprised of multiple devices, such as different transmitting devices for transmitting data over different networks, such as a first transmitting device for transmitting data over a local area network and a second transmitting device for transmitting data via the Internet. The transmitting device 222 can electronically transmit data signals that have data superimposed that can be parsed by a receiving computing device. In some instances, the transmitting device 222 can include one or more modules for superimposing, encoding, or otherwise formatting data into data signals suitable for transmission.

The transmitting device 222 can be configured to electronically transmit data signals to computing devices 104 that are superimposed or otherwise encoded with digital payment instruments, requests for blockchain addresses or public keys, digital artworks available for use, notification messages, requests for authentication credentials, requests for payment, etc. The transmitting device 222 can also be configured to electronically transmit data signals to issuer systems 106, which can be superimposed or otherwise encoded with sets of authentication credentials, requests for authentication or verification, requests for transaction account data, digital payment instruments, requests for digital payment instruments and/or transaction account data, etc. The transmitting device 222 can be further configured to electronically transmit data signals to blockchain nodes 110 that are superimposed or otherwise encoded with blockchain transactions, NFTs, blockchain data values, blocks, requests for blockchain data, digital signatures, public key, requests for authentication or verification, smart contracts, etc. The transmitting device 222 can also be configured to electronically transmit data signals to image providers 112, which can be superimposed or otherwise encoded with requests for digital artwork and/or hyperlinks thereto, requests for restrictions on use, NFTs, requests for NFTs, payment notifications, etc.

Process for Generating an NFT-Integrated Digital Payment Instrument

Figure 3A:
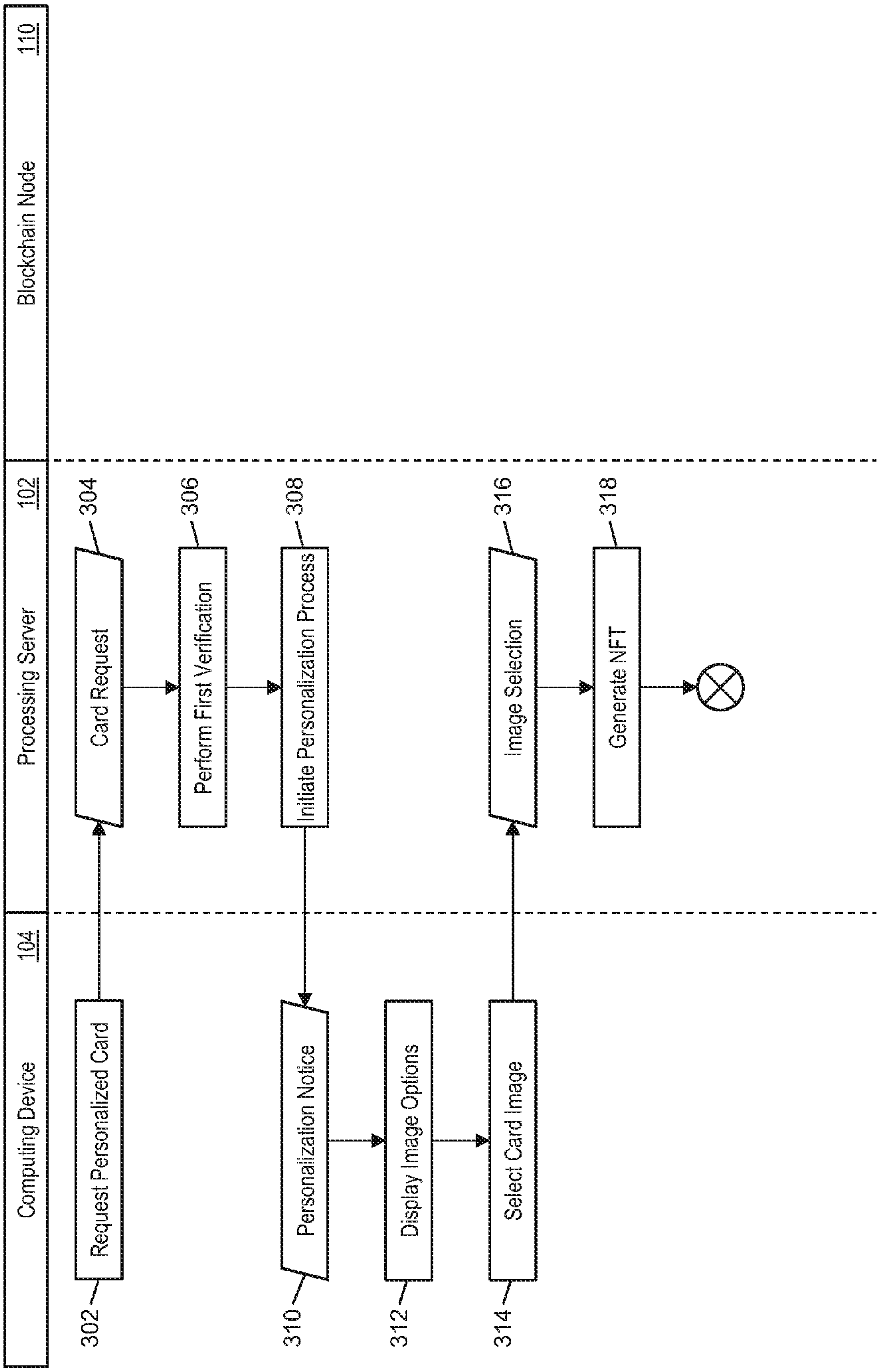
FIGS. 3A and 3B are a flow diagram illustrating a process for issuing a digital payment instrument that utilizes a NFT in the system of FIG. 1 in accordance with exemplary embodiments.
Figure 3B:
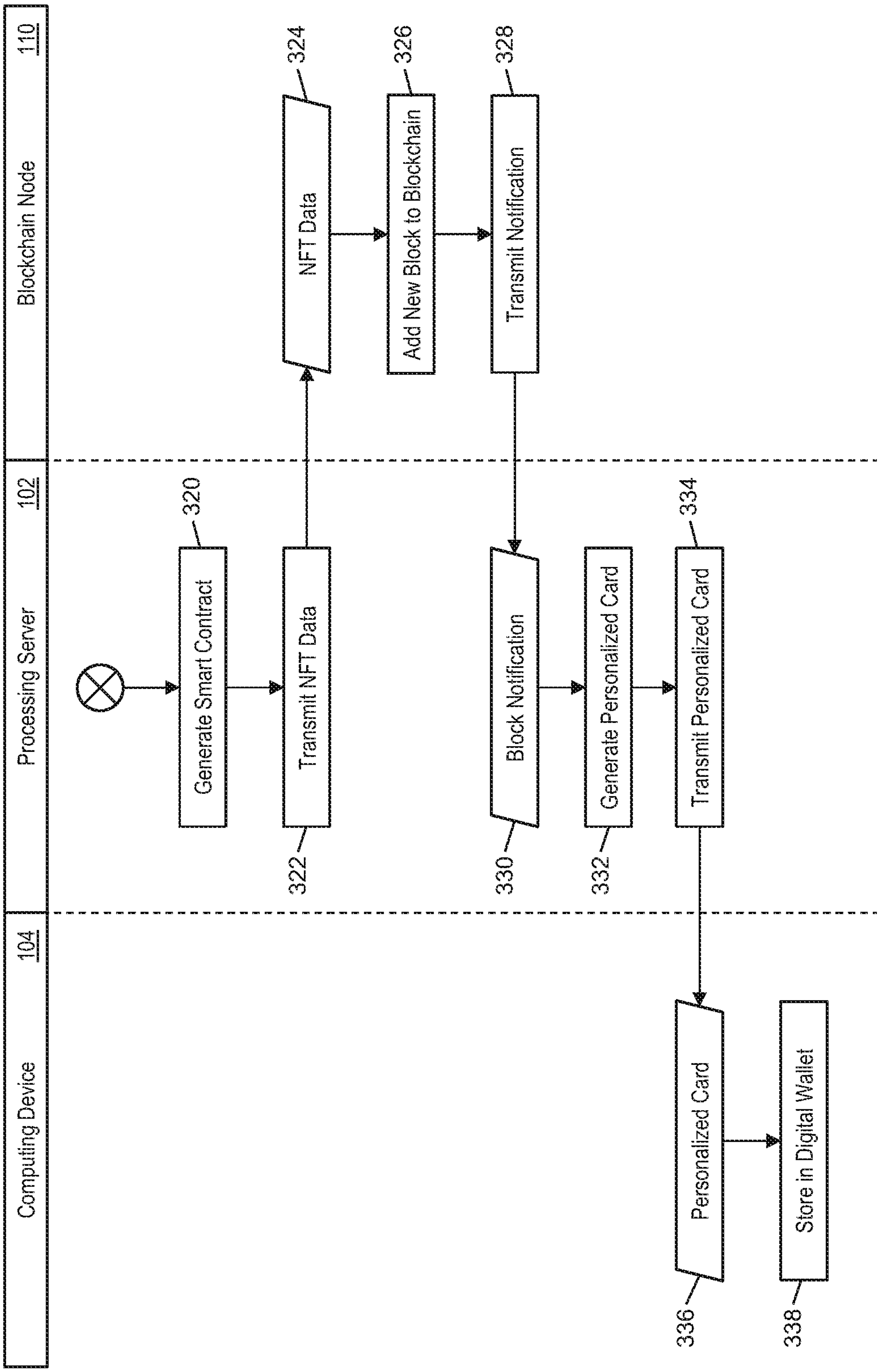

FIGS. 3A and 3B illustrate a process for generating a digital payment instrument that uses digital artwork associated with a NFT for issuing to the computing device 104 by the processing server 102 following creation of the NFT in the system 100 of FIG. 1.

In step 302, the computing device 104 may electronically transmit a request for a personalized card to the processing server 102 using a suitable communication network and method. The request can include at least a first set of authentication credentials and a public key of a cryptographic key pair (e.g., blockchain wallet) of the computing device 104. In step 304, the receiving device 202 of the processing server 102 can receive the request from the computing device 104. In step 306, the validation module 220 of the processing server 102 can perform a first verification process using the first set of authentication credentials. The first set of authentication credentials can include at least a transaction account identifier, where the first verification process can be performed by identifying, via the querying module 216 of the processing server 102, an account profile 208 in the account database 206 of the processing server 102 that includes the transaction account identifier and comparing data values stored therein with data values in the first set of authentication credentials for a match. If there is a match in the data values, then the first verification process is successful.

In step 308, the transmitting device 222 of the processing server 102 can initiate a personalization process by electronically transmitting a plurality of available digital artworks or hyperlinks thereto to the computing device 104 using a suitable communication network and method. In step 310, the computing device 104 can receive the personalization notice that includes the digital artworks. In step 312, the computing device 104 can display the available digital artworks to a user thereof using an integrated or interfaced display device. In step 314, the computing device 104 can receive a selection of a digital artwork to be used as the image of a credit card for the digital payment instrument, which can be electronically transmitted to the processing server 102 using a suitable communication network and method. In step 316, the receiving device 202 of the processing server 102 can receive the selection of the digital artwork.

In step 318, the generation module 218 of the processing server 102 can generate a NFT for the digital artwork that includes a serial number or other identifier associated with the selected digital artwork as well as a NFT identifier uniquely associated with the NFT. In step 320, the generation module 218 can also generate a smart contract that enforces compliance with one or more restrictions applicable to use of the selected digital artwork, such as can be provided by an image provider 112 of the digital artwork. In step 322, the transmitting device 222 of the processing server 102 can electronically transmit the NFT, smart contract, and public key from the computing device 104 to a blockchain node 110 using a suitable communication network and method.

In step 324, the blockchain node 110 can receive the NFT data from the processing server 102. In step 326, the blockchain node 110 can generate a new block that includes a blockchain data value for transfer of ownership of the NFT to a blockchain wallet of the computing device 104 using the provided public key and a blockchain data value that includes the smart contract, which can be the same blockchain value that transferred ownership of the NFT or another blockchain data value. The new block can be transmitted to a plurality of other blockchain nodes 110 for confirmation, after which the new block can be considered added to the blockchain. In step 328, the blockchain node 110 can electronically transmit a notification regarding successful transfer of ownership of the NFT to the processing server 102 using a suitable communication network and method.

In step 330, the receiving device 202 of the processing server 102 can receive the notification regarding addition of the new block that includes the transfer of ownership of the NFT. In step 332, the generation module 218 of the processing server 102 can generate a digital payment instrument, e.g., a digital card. that uses the selected digital artwork and can be used to transmit payment details for an associated transaction account through use of a digital wallet application program. In step 334, the transmitting device 222 of the processing server 102 can electronically transmit the generated personalized digital card to the computing device 104 using a suitable communication network and method. In step 336, the computing device 104 can receive the personalized card from the processing server 102. In step 338, the computing device 104 can store the personalized card in a digital wallet application program for use in participating in electronic payment transactions.

Figure 4:
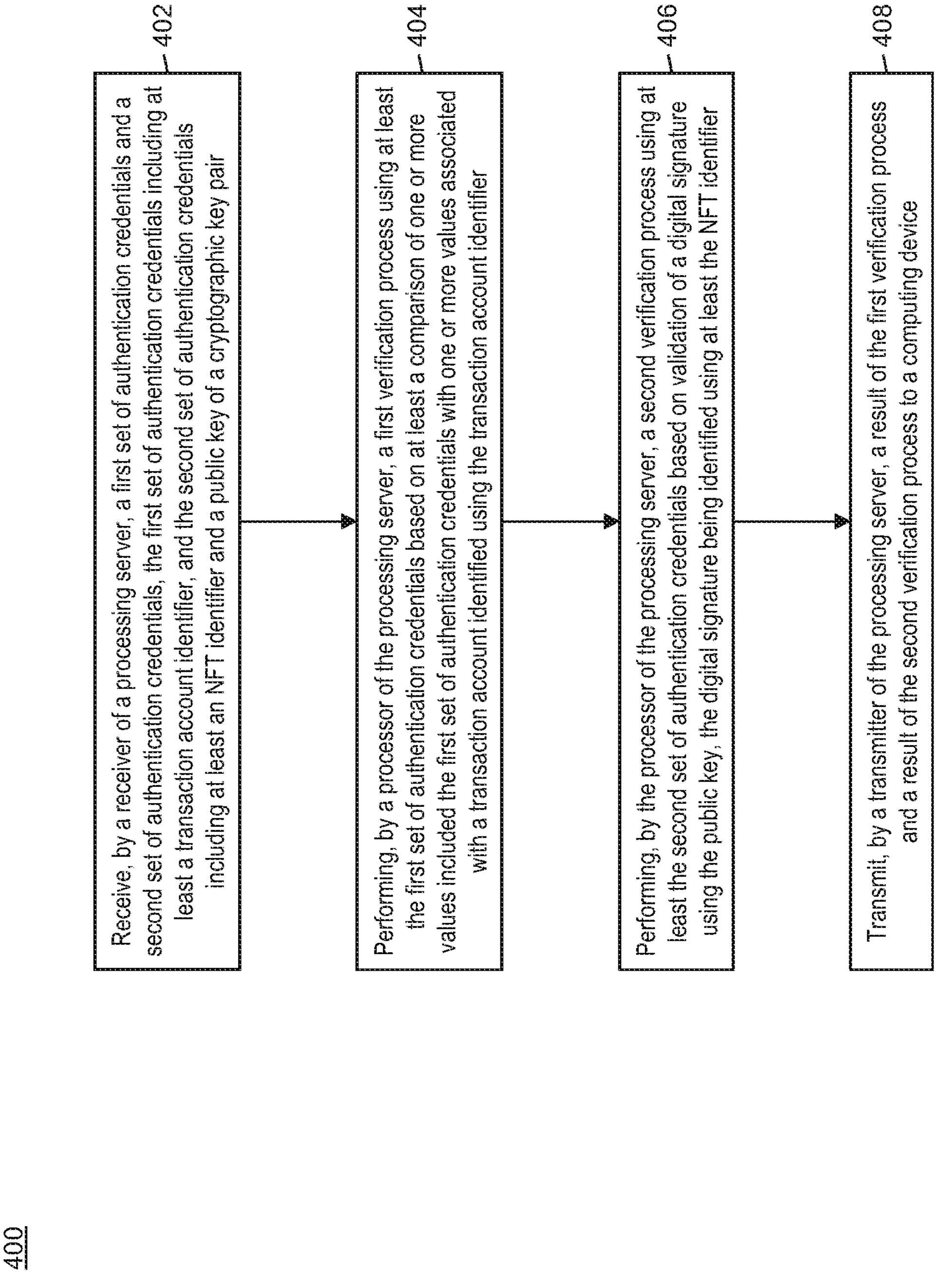
FIG. 4 is a flow chart illustrating an exemplary method for dual verification in combination of NFTs with digital payment instruments in accordance with exemplary embodiments.

Exemplary Method for Dual Verification to Combine a NFT with a Digital Instrument FIG. 4 illustrates a method 400 for the use of a dual verification process to combine a digital artwork associated with a NFT with a digital payment instrument for personalization thereof.

In step 402, a first set of authentication credentials and a second set of authentication credentials can be received by a receiver (e.g., receiving device 202) of a processing server (e.g., processing server 102), the first set of authentication credentials including at least a transaction account identifier, and the second set of authentication credentials including at least an NFT identifier and a public key of a cryptographic key pair. In step 404, a first verification process can be performed by a processor (e.g., validation module 220) of the processing server using at least the first set of authentication credentials based on at least a comparison of one or more values included the first set of authentication credentials with one or more values associated with a transaction account identified using the transaction account identifier.

In step 406, a second verification process can be performed by the processor (e.g., validation module 220) of the processing server using at least the second set of authentication credentials based on validation of a digital signature using the public key, the digital signature being identified using at least the NFT identifier. In step 408, a result of the first verification process and a result of the second verification process can be transmitted by a transmitter (e.g., transmitting device 222) of the processing server to a computing device (e.g., computing device 104).

In one embodiment, the first set of authentication credentials and the second set of authentication credentials can be received from the computing device. In some embodiments, the first verification process can include: identifying, by the processor (e.g., querying module 216) of the processing server, the one or more values associated with the transaction account in an account profile (e.g., account profile 208) in an account database (e.g., account database 206) of the processing server, wherein the account profile is identified using the transaction account identifier; and comparing the one or more values included in the account profile with the one or more values included in the set of authentication credentials, wherein the result of the first verification process is a successful verification if the one or more values included in the account profile match the one or more values included in the set of authentication credentials.

In one embodiment, the first verification process can include: transmitting, by the transmitter of the processing server, the first set of authentication credentials to an external system (e.g., issuer system 106); and receiving, by the receiver of the processing server, the result of the first verification process from the external system. In a further embodiment, the external system can be associated with a financial institution that issued the transaction account.

In some embodiments, the second verification process can include: identifying, by the processor of the processing server, a blockchain data entry included in a blockchain that includes the NFT identifier, wherein the blockchain data entry includes at least an NFT and a digital signature; and validating, by the processor of the processing server, the digital signature using the public key, wherein the result of the second verification process is the result of validation of the digital signature. In a further embodiment, the blockchain can further include a smart contract that includes one or more terms of use of the NFT. In one embodiment, the second verification process can include: transmitting, by the transmitter of the processing server, the second set of authentication credentials to a blockchain node (e.g., blockchain node 110) in a blockchain network (e.g., blockchain network 108) associated with a blockchain that includes a blockchain data entry including the NFT identifier; and receiving, by the receiver of the processing server, the result of the second verification process from the blockchain node.

Computer System Architecture

FIG. 5 illustrates a computer system 500 in which embodiments of the present disclosure, or portions thereof, can be implemented as computer-readable code. For example, the processing server 102, computing device 104, issuer system 106, blockchain nodes 110, and image provider 112 of FIG. 1 can be implemented in the computer system 500 using hardware, non-transitory computer readable media having instructions stored thereon, or a combination thereof and can be implemented in one or more computer systems or other processing systems. Hardware can embody modules and components used to implement the methods of FIGS. 3A, 3B, and 4.

If programmable logic is used, such logic can execute on a commercially available processing platform configured by executable software code to become a specific purpose computer or a special purpose device (e.g., programmable logic array, application-specific integrated circuit, etc.). A person having ordinary skill in the art can appreciate that embodiments of the disclosed subject matter can be practiced with various computer system configurations, including multi-core multiprocessor systems, minicomputers, mainframe computers, computers linked or clustered with distributed functions, as well as pervasive or miniature computers that can be embedded into virtually any device. For instance, at least one processor device and a memory can be used to implement the above-described embodiments.

A processor unit or device as discussed herein can be a single processor, a plurality of processors, or combinations thereof. Processor devices can have one or more processor "cores." The terms "computer program medium," "non-transitory computer readable medium," and "computer usable medium" as discussed herein are used to generally refer to tangible media such as a removable storage unit 518, a removable storage unit 522, and a hard disk installed in hard disk drive 512.

Various embodiments of the present disclosure are described in terms of this example computer system 500. After reading this description, it will become apparent to a person skilled in the relevant art how to implement the present disclosure using other computer systems and/or computer architectures. Although operations can be described as a sequential process, some of the operations can in fact be performed in parallel, concurrently, and/or in a distributed environment, and with program code stored locally or remotely for access by single or multi-processor machines. In addition, in some embodiments the order of operations can be rearranged without departing from the spirit of the disclosed subject matter.

Processor device 504 can be a special purpose or a general-purpose processor device specifically configured to perform the functions discussed herein. The processor device 504 can be connected to a communications infrastructure 506, such as a bus, message queue, network, multi-core message-passing scheme, etc. The network can be any network suitable for performing the functions as disclosed herein and can include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 500 can also include a main memory 508 (e.g., random access memory, read-only memory, etc.), and can also include a secondary memory 510. The secondary memory 510 can include the hard disk drive 512 and a removable storage drive 514, such as a floppy disk drive, a magnetic tape drive, an optical disk drive, a flash memory, etc.

The removable storage drive 514 can read from and/or write to the removable storage unit 518 in a well-known manner. The removable storage unit 518 can include a removable storage media that can be read by and written to by the removable storage drive 514. For example, if the removable storage drive 514 is a floppy disk drive or universal serial bus port, the removable storage unit 518 can be a floppy disk or portable flash drive, respectively. In one embodiment, the removable storage unit 518 can be non-transitory computer readable recording media.

In some embodiments, the secondary memory 510 can include alternative means for allowing computer programs or other instructions to be loaded into the computer system 500, for example, the removable storage unit 522 and an interface 520. Examples of such means can include a program cartridge and cartridge interface (e.g., as found in video game systems), a removable memory chip (e.g., EEPROM, PROM, etc.) and associated socket, and other removable storage units 522 and interfaces 520 as will be apparent to persons having skill in the relevant art.

Data stored in the computer system 500 (e.g., in the main memory 508 and/or the secondary memory 510) can be stored on any type of suitable computer readable media, such as optical storage (e.g., a compact disc, digital versatile disc, Blu-ray disc, etc.) or magnetic tape storage (e.g., a hard disk drive). The data can be configured in any type of suitable database configuration, such as a relational database, a structured query language (SQL) database, a distributed database, an object database, etc. Suitable configurations and storage types will be apparent to persons having skill in the relevant art.

The computer system 500 can also include a communications interface 524. The communications interface 524 can be configured to allow software and data to be transferred between the computer system 500 and external devices. Exemplary communications interfaces 524 can include a modem, a network interface (e.g., an Ethernet card), a communications port, a PCMCIA slot and card, etc. Software and data transferred via the communications interface 524 can be in the form of signals, which can be electronic, electromagnetic, optical, or other signals as will be apparent to persons having skill in the relevant art. The signals can travel via a communications path 526, which can be configured to carry the signals and can be implemented using wire, cable, fiber optics, a phone line, a cellular phone link, a radio frequency link, etc.

The computer system 500 can further include a display interface 502. The display interface 502 can be configured to allow data to be transferred between the computer system 500 and external display 530. Exemplary display interfaces 502 can include high-definition multimedia interface (HDMI), digital visual interface (DVI), video graphics array (VGA), etc. The display 530 can be any suitable type of display for displaying data transmitted via the display interface 502 of the computer system 500, including a cathode ray tube (CRT) display, liquid crystal display (LCD), light-emitting diode (LED) display, capacitive touch display, thin-film transistor (TFT) display, etc.

Computer program medium and computer usable medium can refer to memories, such as the main memory 508 and secondary memory 510, which can be memory semiconductors (e.g., DRAMs, etc.). These computer program products can be means for providing software to the computer system 500. Computer programs (e.g., computer control logic) can be stored in the main memory 508 and/or the secondary memory 510. Computer programs can also be received via the communications interface 524. Such computer programs, when executed, can enable computer system 500 to implement the present methods as discussed herein. In particular, the computer programs, when executed, can enable processor device 504 to implement the methods illustrated by FIGS. 3A, 3B, and 4, as discussed herein. Accordingly, such computer programs can represent controllers of the computer system 500. Where the present disclosure is implemented using software, the software can be stored in a computer program product and loaded into the computer system 500 using the removable storage drive 514, interface 520, and hard disk drive 512, or communications interface 524.

The processor device 504 can comprise one or more modules or engines configured to perform the functions of the computer system 500. Each of the modules or engines can be implemented using hardware and, in some instances, can also utilize software, such as corresponding to program code and/or programs stored in the main memory 508 or secondary memory 510. In such instances, program code can be compiled by the processor device 504 (e.g., by a compiling module or engine) prior to execution by the hardware of the computer system 500. For example, the program code can be source code written in a programming language that is translated into a lower-level language, such as assembly language or machine code, for execution by the processor device 504 and/or any additional hardware components of the computer system 500. The process of compiling can include the use of lexical analysis, preprocessing, parsing, semantic analysis, syntax-directed translation, code generation, code optimization, and any other techniques that can be suitable for translation of program code into a lower-level language suitable for controlling the computer system 500 to perform the functions disclosed herein. It will be apparent to persons having skill in the relevant art that such processes result in the computer system 500 being a specially configured computer system 500 uniquely programmed to perform the functions discussed above.

Techniques consistent with the present disclosure provide, among other features, systems and methods for performing dual verification to combine a NFT with a digital payment instrument. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or can be acquired from practicing of the disclosure, without departing from the breadth or scope.

What is claimed is:

1. A method for performing dual verification to combine a non-fungible token (NFT) with a digital payment instrument, comprising:

receiving, by a processing server, a request for an exclusive digital payment instrument, wherein the request includes a first set of authentication credentials and a second set of authentication credentials, the first set of authentication credentials including (i) a transaction account identifier associated with a transaction account to which the digital payment instrument is to correspond, and (ii) one or more values associated with the transaction account, and the second set of authentication credentials including (i) an NFT identifier associated with an NFT that is associated with a digital artwork, and (ii) a public key of a cryptographic key pair of a blockchain wallet of a computing device;

performing, by the processing server, a first verification process using at least the first set of authentication credentials;

performing, by the processing server, a second verification process using at least the second set of authentication credentials based on validation of a digital signature using the public key, the digital signature being identified using at least the NFT identifier;

in response to successful results of both the first verification process and the second verification process, generating, by the processing server, the digital payment instrument with the digital artwork associated with the NFT as a face of the digital payment instrument; and transmitting, by the processing server, the digital payment instrument with the digital artwork as the face thereof to the computing device where the digital payment instrument is stored in the blockchain wallet.

2. The method of claim 1, wherein the first set of authentication credentials and the second set of authentication credentials are received from the computing device.

3. The method of claim 1, wherein the first verification process includes:

identifying, by the processing server, the one or more values associated with the transaction account in an account profile in an account database of the processing server, wherein the account profile is identified using the transaction account identifier; and comparing the one or more values included in the account profile with the one or more values included in the first set of authentication credentials, wherein the result of the first verification process is a successful verification if the one or more values included in the account profile match the one or more values included in the first set of authentication credentials.

4. The method of claim 1, wherein the first verification process includes:

transmitting, by the processing server, the first set of authentication credentials to an external system; and receiving, by the processing server, the result of the first verification process from the external system.

5. The method of claim 4, wherein the external system is associated with a financial institution that issued the transaction account.

6. The method of claim 1, wherein the second verification process includes:

identifying, by the processing server, a blockchain data entry included in a blockchain that includes the NFT identifier, wherein the blockchain data entry includes at least an NFT and a digital signature; and validating, by the processing server, the digital signature using the public key, wherein the result of the second verification process is the result of validation of the digital signature.

7. The method of claim 6, wherein the blockchain further includes a smart contract that includes one or more terms of use of the NFT.

8. The method of claim 1, wherein the second verification process includes:

transmitting, by the processing server, the second set of authentication credentials to a blockchain node in a blockchain network associated with a blockchain that includes a blockchain data entry including the NFT identifier; and receiving, by the processing server, the result of the second verification process from the blockchain node.

9. A system for performing dual verification to combine a non-fungible token (NFT) with a digital payment instrument, comprising:

a processing server including a memory with instructions stored thereon that when executed, cause the processing server to receive a request for an exclusive digital payment instrument, wherein the request includes a first set of authentication credentials and a second set of authentication credentials, the first set of authentication credentials including (i) a transaction account identifier associated with a transaction account to which the digital payment instrument is to correspond, and (ii) one or more values associated with the transaction account, and the second set of authentication credentials including (i) an NFT identifier associated with an NFT that is associated with a digital artwork, and (ii) a public key of a cryptographic key pair of a blockchain wallet, perform a first verification process using at least the first set of authentication credentials, perform a second verification process using at least the second set of authentication credentials based on validation of a digital signature using the public key, the digital signature being identified using at least the NFT identifier, generate, in response to successful results of both the first verification process and the second verification process, the digital payment instrument with the digital artwork associated with the NFT as a face of the digital payment instrument, and transmit the digital payment instrument with the digital artwork as the face thereof to a computing device where the digital payment instrument is stored in the blockchain wallet.

10. The system of claim 9, wherein the first set of authentication credentials and the second set of authentication credentials are received from the computing device.

11. The system of claim 9, wherein the first verification process includes:

identifying the one or more values associated with the transaction account in an account profile in an account database of the processing server, wherein the account profile is identified using the transaction account identifier; and comparing the one or more values included in the account profile with the one or more values included in the first set of authentication credentials, wherein the result of the first verification process is a successful verification if the one or more values included in the account profile match the one or more values included in the first set of authentication credentials.

12. The system of claim 9, further comprising:

an external system, wherein the first verification process includes transmitting the first set of authentication credentials to the external system, and receiving the result of the first verification process from the external system.

13. The system of claim 12, wherein the external system is associated with a financial institution that issued the transaction account.

14. The system of claim 9, wherein the second verification process includes:

identifying a blockchain data entry included in a blockchain that includes the NFT identifier, wherein the blockchain data entry includes at least an NFT and a digital signature; and validating the digital signature using the public key, wherein the result of the second verification process is the result of validation of the digital signature.

15. The system of claim 14, wherein the blockchain further includes a smart contract that includes one or more terms of use of the NFT.

16. The system of claim 9, further comprising:

a blockchain network including a blockchain node, wherein the blockchain network is associated with a blockchain that includes a blockchain data entry including the NFT identifier, and the second verification process includes:

transmitting the second set of authentication credentials to the blockchain node, and receiving the result of the second verification process from the blockchain node.

* * * * *